Aug. 29, 1944.    B. STECHBART    2,357,146
SIGNAL DEVICE
Filed July 16, 1942
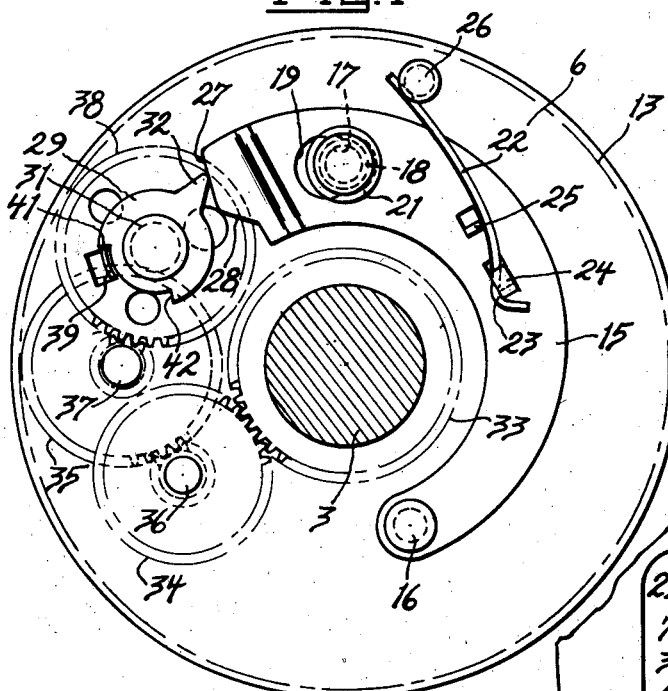
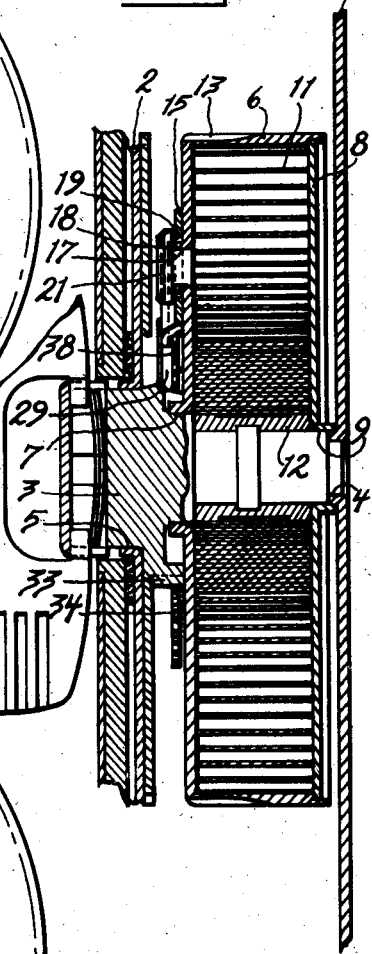
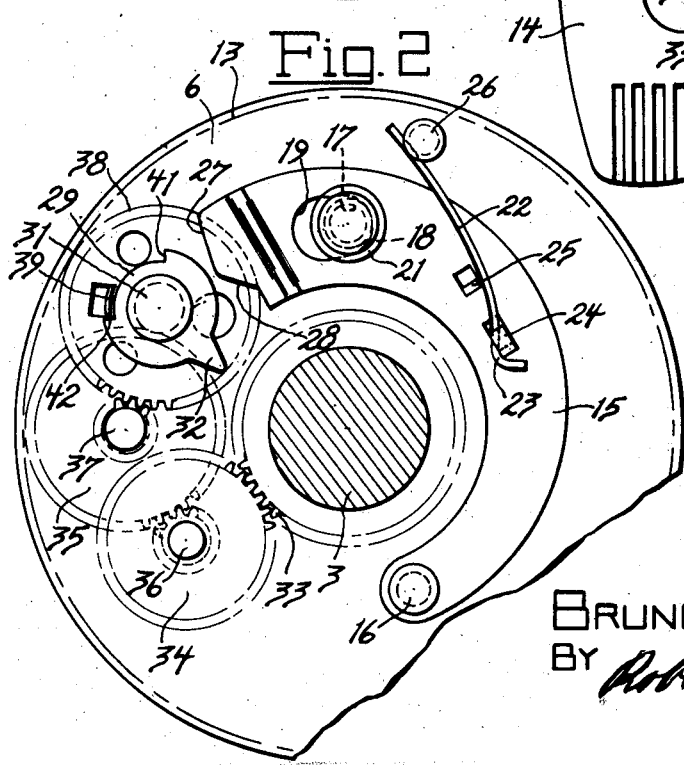
INVENTOR
BRUNO STECHBART
BY
ATTY.

Patented Aug. 29, 1944

2,357,146

UNITED STATES PATENT OFFICE 2,357,146

SIGNAL DEVICE

Bruno Stechbart, Park Ridge, Ill., assignor to The Bell & Howell Company, Chicago, Ill., a corporation of Illinois Application July 16, 1942, Serial No. 451,134

6 Claims. (Cl. 185—44)

My invention relates particularly to a signal device for indicating the end of the run of a spring motor of a motion picture camera for the purpose of indicating to the operator that the spring motor should be rewound, although not limited to this use alone.

The general object of the invention resides in the provision of a novel and effective signal device which is particularly adapted for indicating the run of the spring motor of a motion picture camera for the above purpose and for incorporation in cameras of present accepted design.

The invention will be better understood by reference to the accompanying drawing, in which—

Figures 1 and 2 are partial end elevational views of the spring motor of a motion picture camera embodying my invention and having a part shown in section; and Figure 3 is a partial sectional view of a motion picture camera embodying the spring motor of Figures 1 and 2 taken substantially on an axial plane of the motor.

Referring to the drawing, particularly Figure 3, parallel plates of the mechanism frame of a motion picture camera are designated respectively at 1 and 2. A spring motor spindle 3 extends across between these plates and is rotatably mounted thereon as designated respectively at 4 and 5. A spring motor casing is rotatably mounted on the spindle 3 between the frame plates 1 and 2 and comprises an axially bored cup-shaped motor casing member 6, rotatably mounted on the motor spindle 3 as designated at 7, and an axially bored circular motor casing plate 8 peripherally secured with the lip of the member 6 and rotatably mounted on the motor spindle 3 as designated at 9.

A flat spiral power spring 11 is disposed within the motor casing and has its outer end secured with the peripheral wall of the casing member 6 in a usual manner and has its inner end secured with the spindle 3 also in a unusual manner through the medium of a bushing 12 secured both with the inner end of the spring and the spindle.

The motor casing, comprising the casing member 6 and the casing plate 8, constitutes the spring driven member, and the spindle 3 constitutes the spring winding member of the spring motor, the periphery of the casing member 6 being provided with a spur gear 13 for driving the motion picture mechanism therefrom. The spindle 3 is provided with a usual automatic one-way check, not shown, to prevent unwinding of the spring at the winding spindle and with a manually engageable winding handle 14 for winding the spring.

A crescent-shaped signal member 15 is pivotally mounted at one end thereof, as designated at 16, on the outer face of the radial wall of the member 6 and extends about the axis of this member. See particularly Figures 1 and 2. A bore 17 is provided in this wall of the member 6 in substantially diametrically opposite relation with the pivot mounting 16 and an exterior circular flange 18 is formed on this wall in concentric relation with the bore 17.

The member 15 is provided adjacent the free end thereof with an elongated aperture 19 extending angularly of the pivot mounting 16, and the flange 18 projects into this aperture for engagement with the ends thereof to limit pivotal movement of the member 15. A headed stud 21 is secured in the bore 17 and confines the free end portion of the member 15 between it and the outer face of the member 6.

A spring 22 has a notch formation 23 at one end thereof and has this notch engaged with a lug 24 on the member 15, has the intermediate portion thereof engaged with a second lug 25 on the member 15 in opposite relation with engagement of the lug 24, and has the other end thereof engaged with a stud 26, secured on the member 6, in opposite relation with engagement of the lug 25. As so engaged, the spring 22 is tensioned and yieldably urges the member 15 in one direction or to the left in Figures 1 and 2, the flange 18 engaging the right hand end of the aperture 19 to limit movement of the member 15 in this direction.

The free end of the signal member 15 is provided with a cam formation facing angularly of the pivotal axis thereof and to the left in Figures 1 and 2 and comprising oppositely inclined cam portions 27 and 28 arranged in the form of an obtuse inverted V. A second signal member 29 is rotatably mounted on a stud 31 secured on the radial face of the member 6 in parallelism with the pivotal axis of the member 15 and adjacent the free end thereof, and is provided with a radial arm 32 periodically engageable, in its rotation, with the aforesaid cam formation comprising the cam portions 27 and 28 to actuate the member 15 in the direction opposed by the spring 22 and to release the same, so that, the member 15 being thus released, the spring 22 actuates the member 15 to cause an audible signal by reason of an end of the aperture 19 impacting against the flange 18.

A reduction spur gear driving train for driving the second signal member 29 with relative rotation of the winding spindle 3 and the power spring driven member 6 comprises a primary drive gear 33 concentrically fixed with the winding spindle 3, intermediate reduction gears 34 and 35 respectively rotatably mounted on spaced studs 36 and 37 secured on the radial face of the member 6 and a final drive gear 38 rotatably mounted on the stud 31 concentric with the rotatable signal member 29.

The final drive gear 38 is operatively connected with the signal member 29 by means of a lost motion drive connection comprising a laterally projecting abutment drive lug 39 on the gear 38 disposed between and engageable alternately with opposing angularly spaced abutment drive shoulders 41 and 42 of the signal member 29, the drive shoulders 41 and 42 being widely spaced angularly as compared to the angular extent of the lug 39 to form a lost motion drive connection between the final drive gear 38 and the signal member 29.

As shown, the driven member 6 of the spring motor is driven clockwise in Figures 1 and 2, and the winding spindle 3 is rotated in the same direction to wind the power spring 11. Relative angular movement of the driven member 6 and the winding spindle 3 effects rotation of the gears of the reduction gear train.

As the spring 11 of the spring motor is wound by clockwise rotation of the winding spindle 3, the final drive gear 38 is rotated counter clockwise and this gear rotates the signal member 29 correspondingly, the arm 32 engaging the cam portion 28 and actuating the signal member 15 in opposition to the spring 22 and then releasing the same as it engages the cam portion 27.

As the driven member 6 of the spring motor is driven clockwise by the power spring 11, the final drive gear 38 is rotated clockwise and this gear rotates the signal member 29 correspondingly, the arm 32 engaging the cam portion 27 and actuating the signal member 15 in opposition to the spring 22 and then releasing the same as it engages the cam portion 28.

The lost motion drive connection between the final drive gear 38, comprising the lug 39 and the opposing shoulders 41 and 42, permits of the member 29 and its arm 32 being suddenly angularly advanced and the member 15 suddenly returned to its normal position by the spring 22 with engagement of the cam portion, say the portion 28, of the member 15, which faces in the instant direction of rotation of the gear 38, thus effecting an audible signal by impact to apprize the operator of the condition of the power spring such as that the spring is nearing unwound condition. Figure 1 shows the position of the parts immediately preceding signal actuation, and Figure 2 shows the position of the parts immediately after a signal actuation.

By reason of the reduction gear train driving the member 29, the signal device is actuated at the end of a predetermined number of revolutions of the driven member 6 for the instant purpose of indicating a predetermined run of the spring motor.

While I have thus described my invention, I do not wish to be limited to the precise details described, as changes may be readily made without departing from the spirit of my invention, but having thus described my invention, I claim as new and desire to secure by Letters Patent the following:

1. In a device of the character described, the combination with a first movably mounted signal member yieldably urged in one direction, a second movably mounted signal member, cam means periodically operative between said signal members incident to movement of said second signal member in both directions of movement thereof to actuate said first signal member in the other direction of movement thereof and to release the same, a driven member, and lost motion drive means for driving said second signal member from said driven member.

2. In a device of the character described, the combination with a first movably mounted signal member yieldably urged in one direction, a second rotatably mounted signal member periodically engageable in its rotation with said first signal member and operative thereon to actuate the same in the other direction of movement thereof and to release the same, a reduction gear driving train of which the final drive gear is disposed concentric with said second signal member, and a lost motion drive connection between said second signal member and said final drive gear.

3. In a device of the character described, the combination with a spring motor including a rotatable spring driven member, of a signal member movably mounted on said driven member and yieldably urged in one direction, a second signal member rotatably mounted on said driven member and periodically engageable in its rotation with said first signal member and operative to actuate the same in the other direction of movement thereof and to release the same, a reduction gear driving train of which the final drive gear is rotatably mounted on said driven member concentric with said second signal member and of which the primary drive gear is disposed concentrically of said driven member and with respect to which said driven member is rotatable, and a lost motion drive connection between said second signal member and said final drive gear.

4. In a device of the character described, the combination with a spring motor including a rotatable spring driven member, of a signal member movably mounted on said driven member and yieldably urged in one direction, a second signal member rotatably mounted on said driven member and periodically engageable in its rotation with said first signal member and operative to actuate the same in the other direction of movement thereof and to release the same, and a gear driving train for driving said second signal member of which the final drive gear is rotatably mounted on said driven member concentric with said second signal member and of which the primary drive gear is disposed concentrically of said driven member and with respect to which said driven member is rotatable.

5. In a device of the character described, the combination with a spring motor comprising independently rotatable concentric spring driven and winding members and a power spring operative therebetween, of a signal member movably mounted on said driven member and yieldingly urged in one direction, a second signal member rotatably mounted on said driven member and periodically engageable in its rotation with said first signal member and operative thereon to actuate the same in the other direction of movement thereof and to release the same, and a gear driving train for driving said second signal member of which the final drive gear is rotatably mounted on said driven member concentric with said second signal member and of which the primary drive gear is concentrically fixed with said winding member.

6. In a device of the character described, the combination with a spring motor comprising independently rotatable concentric spring driven and winding members and a power spring operative therebetween, of a signal member movably mounted on said driven member and yieldably urged in one direction, a second signal member rotatably mounted on said driven member, cam means periodically operative between said signal members incident to rotation of said second signal member in both directions of movement thereof to actuate said first signal member in the other direction of movement thereof and to release the same, a reduction gear driving train of which the final drive gear is rotatably mounted on said driven member concentric with said second signal member and of which the primary drive gear is concentrically fixed with said winding member, and a lost motion drive connection between said second signal member and said final drive gear.

BRUNO STECHBART.